United States Patent
Grant et al.

(10) Patent No.: US 7,085,734 B2
(45) Date of Patent: Aug. 1, 2006

(54) PRICE DECISION SUPPORT

(76) Inventors: D. Graeme Grant, 40 Clafin Rd. #3, Brookline, MA (US) 02445; Matthew A. Killingsworth, 16 Hancock St. #8, Boston, MA (US) 02114

(*) Notice: Subject to any disclaimer, the term of this patent is extended or adjusted under 35 U.S.C. 154(b) by 649 days.

(21) Appl. No.: 09/900,706

(22) Filed: Jul. 6, 2001

(65) Prior Publication Data

US 2003/0028437 A1    Feb. 6, 2003

(51) Int. Cl.
G06Q 20/00    (2006.01)

(52) U.S. Cl. ............................. 705/20; 705/7

(58) Field of Classification Search ............... 715/503; 705/16, 26, 27, 7, 20
See application file for complete search history.

(56) References Cited

U.S. PATENT DOCUMENTS

| | | |
|---|---|---|
| 5,237,496 A | 8/1993 | Kagami et al. |
| 5,237,498 A | 8/1993 | Tenma et al. |
| 5,282,128 A * | 1/1994 | Braude ........................ 700/28 |
| 5,450,314 A | 9/1995 | Kagami et al. |
| 5,559,313 A * | 9/1996 | Claus et al. ................... 705/30 |
| 5,590,197 A * | 12/1996 | Chen et al. .................... 705/65 |
| 5,758,328 A | 5/1998 | Giovannoli |
| 5,765,143 A | 6/1998 | Sheldon et al. |
| 5,822,736 A | 10/1998 | Hartman et al. |
| 5,933,813 A | 8/1999 | Teicher et al. |
| 5,963,919 A | 10/1999 | Brinkley et al. |
| 5,974,396 A | 10/1999 | Anderson et al. |
| 5,983,224 A | 11/1999 | Singh et al. |
| 5,987,425 A | 11/1999 | Hartman et al. |
| 6,006,196 A | 12/1999 | Feigin et al. |
| 6,009,407 A | 12/1999 | Garg |
| 6,029,139 A | 2/2000 | Cunningham et al. |
| 6,061,691 A | 5/2000 | Fox |
| 6,078,901 A * | 6/2000 | Ching ......................... 705/35 |
| 6,092,049 A | 7/2000 | Chislenko et al. |
| 6,151,582 A | 11/2000 | Huang et al. |
| 6,205,431 B1 | 3/2001 | Willemain et al. |
| 6,230,150 B1 | 5/2001 | Walker et al. |
| 6,253,187 B1 | 6/2001 | Fox |
| 6,293,866 B1 | 9/2001 | Walker et al. |
| 6,306,038 B1 | 10/2001 | Graves et al. |
| 6,308,162 B1 | 10/2001 | Ouimet et al. |
| 6,328,648 B1 | 12/2001 | Walker et al. |
| 6,331,144 B1 | 12/2001 | Walker et al. |
| 6,341,269 B1 | 1/2002 | Dulaney et al. |
| 6,366,890 B1 | 4/2002 | Usrey |
| 6,397,166 B1 | 5/2002 | Leung et al. |
| 6,397,197 B1 | 5/2002 | Gindlesperger |
| 6,450,406 B1 * | 9/2002 | Brown .................. 235/462.45 |

(Continued)

FOREIGN PATENT DOCUMENTS

EP    1271278 A2    2/2003

(Continued)

OTHER PUBLICATIONS

White, Ron, How Computers Work, Millennium Ed. Que Corporation, Sep. 1999.*

(Continued)

*Primary Examiner*—Andrew J. Fischer
(74) *Attorney, Agent, or Firm*—Chapin IP Law, LLC; Barry W. Chapin, Esq.

(57) ABSTRACT

A user interface displays markdown price recommendations for a given set of retail merchandise aimed at attaining optimal gross margin while clearing merchandise from a retailer by a given date and adhering to the retailer's business rules and operational constraints.

12 Claims, 9 Drawing Sheets

U.S. PATENT DOCUMENTS

| | | | |
|---|---|---|---|
| 6,493,678 B1 | 12/2002 | Foster et al. | |
| 6,496,834 B1 | 12/2002 | Cereghini et al. | |
| 6,520,856 B1 | 2/2003 | Walker et al. | |
| 6,553,352 B1 | 4/2003 | Delurgio et al. | |
| 2001/0014868 A1 | 8/2001 | Herz et al. | |
| 2001/0044766 A1 | 11/2001 | Keyes | |
| 2001/0047293 A1 | 11/2001 | Waller et al. | |
| 2001/0051932 A1* | 12/2001 | Srinivasan et al. | 705/400 |
| 2002/0022985 A1 | 2/2002 | Guidice et al. | |
| 2002/0029176 A1 | 3/2002 | Carlson et al. | |
| 2002/0072977 A1 | 6/2002 | Hoblit et al. | |
| 2002/0082899 A1* | 6/2002 | Aley | 705/10 |
| 2002/0165799 A1* | 11/2002 | Jaffe et al. | 705/27 |
| 2002/0174119 A1 | 11/2002 | Kummamuru et al. | |
| 2002/0178109 A1* | 11/2002 | Bye | 705/37 |
| 2003/0028437 A1 | 2/2003 | Grant et al. | |
| 2003/0046127 A1 | 3/2003 | Crowe et al. | |

FOREIGN PATENT DOCUMENTS

| | | |
|---|---|---|
| JP | 0200184239 A | 3/2001 |
| WO | WO 90/09638 A1 | 8/1990 |
| WO | WO 98/21907 | 5/1998 |
| WO | WO 02/29696 A1 | 4/2002 |

OTHER PUBLICATIONS

Derfler, Frank J. et al. How Networks Work, Millennium Ed., Que Corporation, Jan. 2000.*

Gralla, Preseton, How the Internet Works, Millennium Ed., Que Corporation, Aug. 1999.*

Levenbach, Hans, and Clearly, James P.; The Beginning Forecaster: The Forecasting Process Through Data Analysis; Wadsworth, Inc., Belmont CA, 1981.*

Chester, Thomas, and Alden, Richard H.; Mastering Excel 97, 4th Ed., Sybex Inc., Alameda, CA, 1997.*

Hirschey, Mark, and Pappas, James L; Managerial Economics, 8th Ed., The Dryden Press, Fort Worth, TX, 1996.*

Achabal et al., A Decision Support System for Vendor Managed Inventory, Winter 2000, Journal of Retailing, vol. 76, No. 4, p. 430.

"Fair Market to Take Guesswork Out of Sale Pricing With New Performance-Based Markdown Engine; Major Step in Online Selling to Help Merchants Maximize Margins," Business Wire, May 21, 2001. (3 pages).

Screenshots of www.grossprofit.com.

"Merchants Try Complex Math Tools to Improve Inventory Decisions," by Koloszyc from Stores Magazine.

SAS/STAT User's Guide, Version 8 (SAS Publishing: 1999) pp. 1-129.

Ackerman, Jerry, "Looking Back to Fashion's Future," The Boston Globe Oct. 7, 1998 [Jan. 7, 2003], 3 pages, retrieved from: archive.org and Google.com.

Agrawal, Rakesh et al. "Fast Similarity Search in the Presence of Noise, Scaling, and Translation in Time-Series Databases," Proceedings of the 21st International Conference on Very Large Data Bases Sep. 11-15, 1995.

Datz, Todd, "Pythagorean Pantsuits-Modeling Merchandise," *CIO Magazine*, Feb. 15, 1999 [retrieved Jan. 7, 2003], 1 page, retrieved from Google.com and archive.org.

Gaffney, Scott and Padhraic Smyth, "Trajectory Clustering with Mixtures of Regresion Models," *Proceedings: The Fifth ACM SIGKDD International Conference on Knowledge Discovery and Data Mining* Aug. 15-18, 1999, pp. 63-72.

"Gymboree Selects TSI to Design and Implement Inventory Optimization and Pricing Solution," TSI Press Release, Jan. 13, 1999 [retrieved Jan. 7, 2003], 2 pages, retrieved from: Google.com and archive.com.

Jain, Anil K. and Richard C. Dubes, Algorithms for Clustering Data (Prentice Hall: 1988) pp. ix-xi, 1-30.

Koegh, Eamonn and Padhraic Smyth, "A Probabilistic Approach to Fast Pattern Matching in Time Series Databases," Proceedings of the Third Conference in Knowledge Discovery in Databases and Data Mining (1997).

Keogh, Eamonn J. and Michael J. Pazzani, "An Enhanced Representation of Time Series Which Allows Fast and Accurate Classification, Clustering and Relevance Feedback," *Fourth Conference on Knowledge Discovery in Databases and Data Mining* (1998) pp. 239-243.

Keogh, Eamonn J. and Michael J. Pazzani, "Relevance Feedback Retrieval of Time Series Data," *22nd International* Conference on Research and Development in Information Retrieval, Aug. 1999.

Keogh, Eamonn "A Fast and Robust Method for Pattern Matching in Time Series Databases," *Proceedings of WUSS* (1997).

Koloszyc, Ginger, "Merchants Try Complex Mathematical Tools to Improve Inventory Decisions," *Stores Magazine* Nov. 1999 [retrieed Jan. 7, 2003], 3 pages, retrieved from: Google.com and archive.org.

Kopalle, Praveen K. et al. "The Dynamic Effect of Discounting on Sales: Empirical Analysis and Normative Pricing Implications," Marketing Science 18:3 (1999) 317-332.

Levy, Michael R. and Woo, Jonathan, Ph.D. "Yield Management in Retail: The Application of Advanced Mathematics to the Retail Pricing Dilemma," TSI (Marketing Materials), 1999.

Merritt, Jennifer, "Company makes Science out of Shopping Trends," *Boston Business Journal* Sep. 3, 1998 [retrieved on Jan. 7, 2003], 3 pages, retrieved from: Google.com and archive.org.

Rice, John A. "Mathematics Statistics and Data Analysis," 2nd Ed. Duxbury Press pp. xiii-xx, 1-30.

Screenshots of Technology Strategy, Inc., www.grossprofit.com, Mar. 2, 2000 [retrieved on Jan. 7, 2003], 9 pages, retrieved from: Google.com and archive.org.

Silva-Risso, Jorge M. et al. "A Decision Support System, for Planning Manufacturers' Sales Promotion Calendars," Marketing Science 18:3 (1999) 274-300.

Smith, Stephen A. and Achbal, Dale D. "Clearance Pricing and Inventory Policies for Retail Chains," Management Science 44:3 (Mar. 1998), pp. 285-300.

"Technology Strategy, Inc. Names Jonathan Woo as Director of R&D," TSI Press Release, Jul. 15, 1998 [retrieved Jan. 7, 2003], 1 pages, retrieved from: Google.com and archive.org.

"Wal-mart: Retailer of the Century: High-Tech Complements Human Touch." *Discount Store News* Oct. 11, 1999 [retrieved Jun. 26, 2002], 3 pages, retrieved from www.lexus.com.

Technology Strategy, Inc., company marketing materials, copyright 1991, Technology Strategy, Inc.

Spyros Makridakis, "Forecasting", copyright 1997, John Wiley & Sons, Inc., pp. 312, 373-374.

Technology Strategy, Inc., company marketing materials, copyright 1998, Technology Strategy, Inc.

Qinan Wang, et al., "Improving a supplier's quantity discount gain from many difference buyers"; Nanyang Business School, School of Mechanical and Productivity Engineering, Nanyang Technological University, Singapore, May 1998, *IIE Transactions*, (2000) 32:1071-1079.

Businessworld (Philippines): Special Feature: Alliances of Accenture, Accenture, Profitlogic team helps retailers enhance sales; *Businessworld*; Feb. 5, 2001 issue 01163930, p. 1.

* cited by examiner

PRICE DECISION SUPPORT

BACKGROUND

This invention relates to price decision support.

Price decisions are critical to a distributor of retail merchandise as it seeks to maximize profits within an acceptable level of risk. Price decisions determine the initial prices to set for each item and when and by how much to mark down prices.

SUMMARY

In general, in one aspect, the invention features (1) displaying information about proposed markdowns of retail prices for items of commerce, the proposed markdowns being based on a predefined objective function and on a predefined automatic analysis, (2) enabling the user to cause changes in the automatic analysis, and (3) displaying to the user information about an impact of the changes on metrics associated with the items.

Implementations of the invention may include one or more of the following features. The metrics are sales dollars, gross profit, or time when out of stock will occur. The changes in the automatic analysis include specifying a markdown price in place of a markdown price determined by the automatic analysis. The changes in the automatic analysis include rejecting at least one of the proposed markdowns. The information displayed about proposed markdowns includes the amounts of the markdowns. The information displayed about proposed markdowns includes the costs of the markdowns. The user can control the status of the displaying of the markdowns to permit interaction with the displayed information prior to committing to executing markdowns. The information about proposed markdowns includes composite information about the total impact of the markdowns. The information about proposed markdowns is displayed at a level selected by the user. The level includes individual items, or items that belong to a style, or subdivisions or division of a commercial operation. The changes in the automatic analysis include changes in the objective function or in rules that govern the analysis. The objective function includes optimizing gross margin dollars while targeting % sell-through by an out-of-stock date. The information about proposed markdowns includes a forecast of financial outcomes by time period with respect to one or more of the items of commerce. The financial outcomes include sales, inventory, or margin. The information about proposed markdowns includes a what-if analysis that predicts financial outcomes based on user indicated markdowns in a succession of time periods. The financial outcomes include sales, inventory, or margin.

In general, in another aspect, the invention features a user interface for a model that predicts optimal markdowns of items of commerce. The user interface includes displayed rows, each row identifying an item or group of items of commerce and showing markdown information for the item or group. The markdown information includes a markdown price and a financial impact of the markdown price. An interactive element enables a user to propose a different markdown price for an item or group of items than one provided automatically by a model. A second interactive element enables a user to select or reject a markdown price for each of the items or groups of items displayed in the rows. Information is displayed about the aggregate financial impact of the selected markdown prices for the items or groups of items.

Other advantages and features will become apparent from the following description and from the claims.

DESCRIPTION (FIG. 1 shows a screen shot of a Login Screen.

FIG. 5 shows a screen shot of a Merchandise Maintenance Screen.

The system described here provides an easy-to-use, rich interface that enables a user observe and manipulate a range of aspects of a model that generates proposed markdown prices for items of commerce. The proposed markdown prices are based on historical information about demand behavior associated with different prices of the items of commerce and desired outdates for the items (that is, the dates on which the retailer wishes to have no remaining inventory of the respective items). Details about an example of such a model are set forth in U.S. patent application Ser. No. 09/263,979, filed Mar. 5, 1999, and incorporated by reference.

The recommendations for markdown prices generated by the model are conveyed to the user through a graphical user interface. The user can observe and manipulate aspects of the analysis to consider a variety of scenarios.

The interface also enables the user to execute proposed markdowns and modifications of the markdowns suggested by the user. The user can observe recommended markdowns by week during a season, including the current week and futures weeks. Users can compare multiple pricing scenarios and can see summarized forecasted financial performance.

The markdown recommendations are generated based also on operational constraints associated with the markdown decisions. The application may be run as an application service provider ASP (hosted by a central facility and accessed remotely by the client), or deployed as software hosted and run at a client's site.

The recommended markdowns that are displayed to a user for a style of an item of commerce are based on a predefined objective function. The user can specify alterations in the markdowns and can see the impact of the alterations in terms of markdown costs and budget.

The application enables a user to view and work with optimal markdown scenarios for retail items that can be used to support markdown decisions. By markdown decisions, we mean, for example, decisions about permanent price reductions of retail items.

Figure 1:
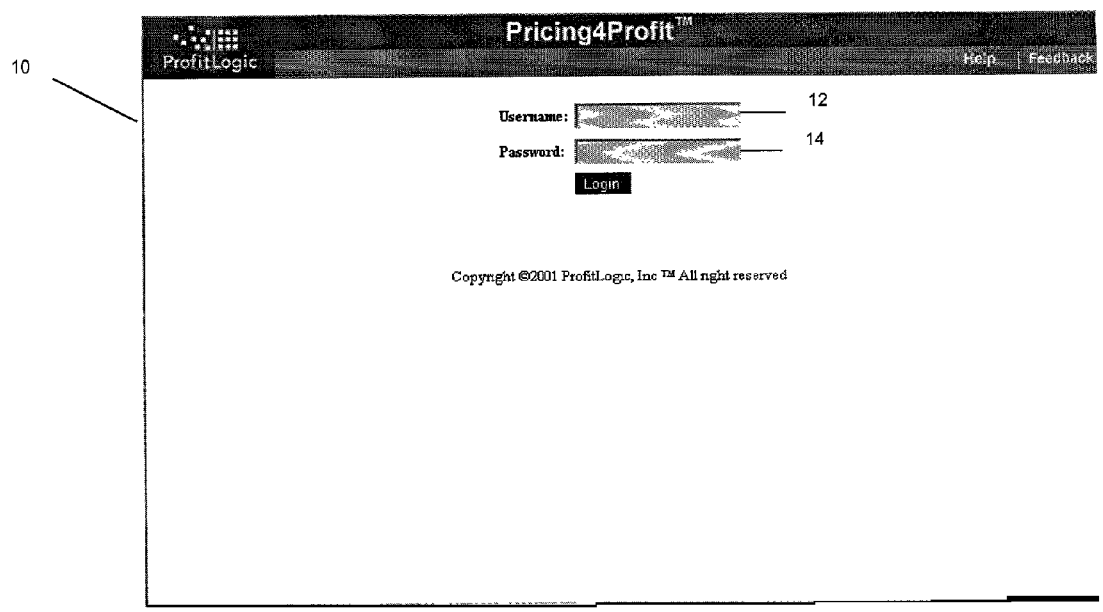

As shown in FIG. 1, the application is accessed through a web browser. Users enter the application through a login screen 10. Users have unique, case-sensitive login names 12 and passwords 14, which define user-level authorities and permissions. This provides application security.

Figure 2:
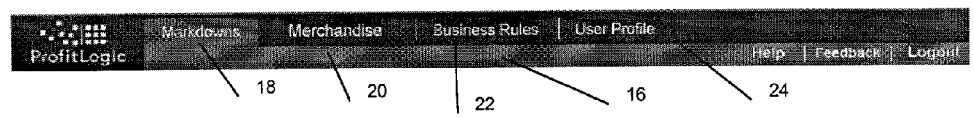
FIG. 2 shows a screen shot of a Navigation Bar.

As shown in FIG. 2, a Navigation Bar 16 on each screen enables users to access features and components of the application. The features and components are invoked using tabs labeled markdown 18, merchandise 20, business rules 22, and user profile 24.

Invoking the markdown tab or merchandise tab leads to worksheets in which users can take markdowns and manipulate merchandise.

Figure 3:
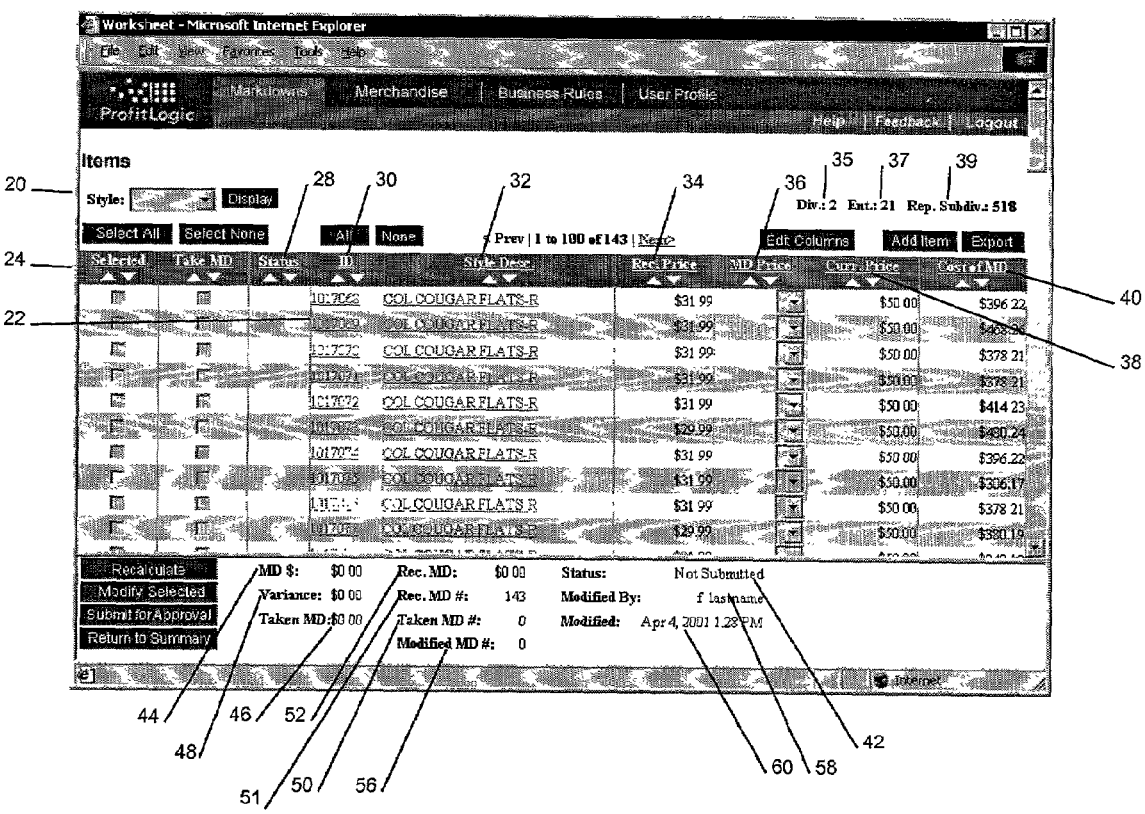
FIG. 3 shows a screen shot of a Worksheet Screen.

As shown in the markdown worksheet 20 of FIG. 3, a worksheet displays a set of merchandise data defined at a level of the merchandise hierarchy that has been selected by the client at system configuration (e.g., the level could be vendor or subdivision of vendor).

Each worksheet is further segmented by a level selected by the client at system configuration (e.g., collections of items, individual items). In the examples shown in FIG. 3, the level is collections of shoe items.

The items or collections 22 that appear on a worksheet may vary from week to week, depending on whether they are being recommended by the system for a markdown in a current time period. Items that appear on a worksheet are those that meet the markdown eligibility requirements outlined by the client's business rules and have been determined by the model to be at an optimal time for a specified markdown.

The merchandise data is displayed in columns that include specific information about sales, inventory, and past, current, and future pricing. As shown in FIG. 3, the columns include a selection column 24, a check-mark column 26 for the user to indicate acceptance of a recommended markdown, a status column 28 that indicates the status of the markdown, a column 30 that shows an id for the item, a style description column 32, a recommended marked-down price column 34, a marked-down price column 36 that represents the price to which the item will be marked down, a current price column 38, and a cost of mark down column 40 (which is the product of the number of units of the item and the markdown per unit).

Figure 4:
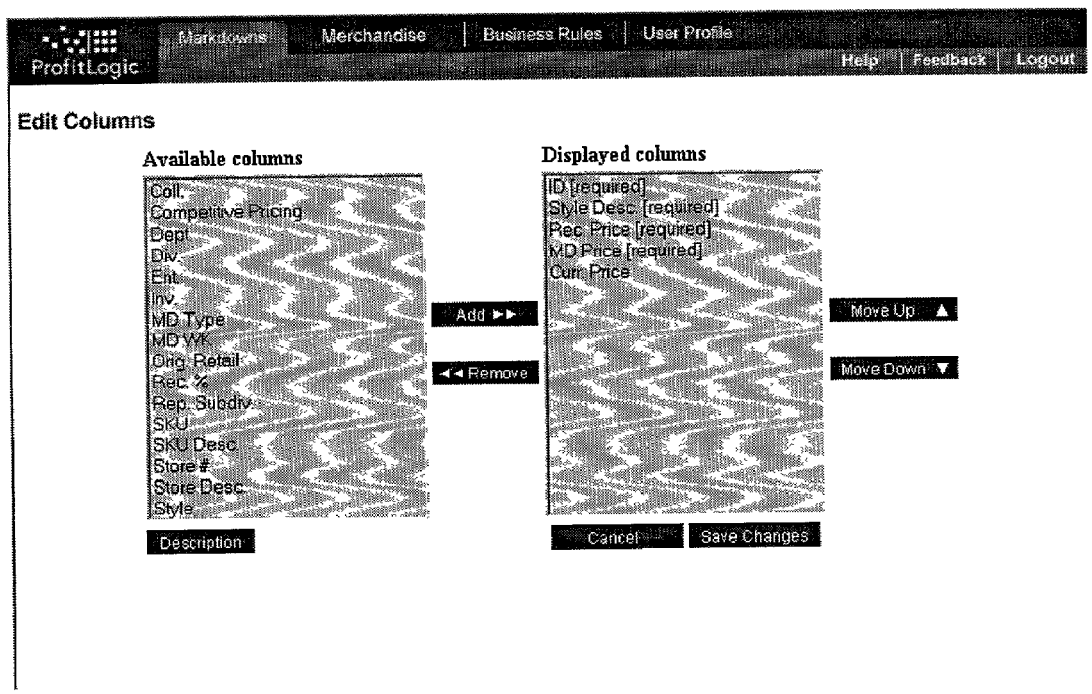
FIG. 4 shows a screen shot of an Edit Columns Screen.

A variety of other columns can also be displayed. The choice of columns to be displayed and the order in which they appear is chosen by the user in a selection screen shown in FIG. 4. Users can also sort date by any selected column.

A worksheet has a status 42 (FIG. 3) that tells the user what actions have been performed on that worksheet. Possible worksheet status values include:

Not Submitted: A worksheet may or may not have changes indicated, but it has not yet been submitted for approval.

Submitted: A user has finished creating markdown scenarios and taking markdowns on a worksheet, and has submitted the worksheet for approval.

Approved: A worksheet that was submitted is approved by a user who has "Approve" access, which means the markdowns that were taken on the worksheet have been accepted. Once approved, the worksheet will be executed at a cutoff time.

Executed: A worksheet was approved by the cutoff time has been processed, that is, sent to a price file for implementation.

Users can view summary metrics for merchandise data on a particular worksheet for values that they specify at system configuration, including, but not limited to:

Available markdown budget 44

Taken markdown dollars 46, which is the price change multiplied by the inventory for all items on Worksheet. This is used only for retail accounting.

Variance amount 48, which is the available markdown amount minus the markdown amount taken.

Number of markdowns taken 50

Amount of recommended markdowns 52

Number of recommended markdowns 54

Number of markdowns changed from the model's recommendation 56

Worksheet status 42

The username of the person who last modified the worksheet 58

The date and time the worksheet was last modified 60

At system configuration, a user can select a hierarchy level (below the level selected for worksheets) to be the smallest unit of merchandise data (e.g., item or collection) displayed in worksheets.

For each unit, which is displayed one to a row on the worksheets, there are columns providing corresponding data for that item.

Figure 5:
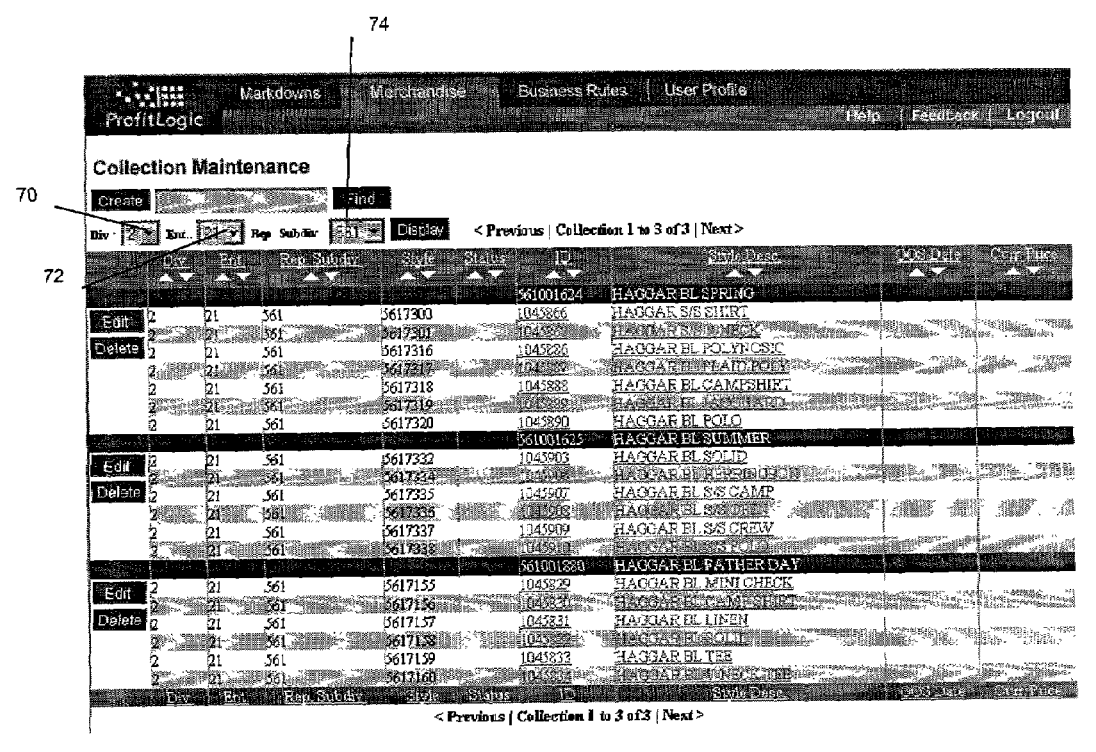

A user can add or remove the individual units to or from his worksheets through a search and selection in a Collection Maintenance screen shown in FIG. 5, depending on which data they require to make their markdown decisions. The searching can be done using the drop down boxes 70, 72, and 74 and the individual items can be highlighted and edited or deleted as needed.

Users can also change outdates for units in column 76, which in turn will alter the markdown recommendation for those units the following week. Changing the outdate causes the inventory to be marked down more aggressively or more conservatively depending on which direction the outdate is changed. Lengthening the outdate can lead to less aggressive markdowns. Shortening the outdate can lead to more aggressive markdowns.

Users can accept markdown recommendations for all units or only for those units that they have selected, or they can accept no markdown recommendations.

Users can also change the prices to which they want to markdown specific units, overriding the model's markdown recommendations.

Users can select a combination of the model's markdown recommendations and their overrides and can view summary information for different markdown scenarios, as shown in FIG. 3. The summary information displayed includes, but is not limited to the items listed below:

Status 42 indicates that a worksheet is Not Submitted, Submitted for approval, Approved, or Executed.

Division 35, Entity 37, and Subdivision 39 identify the worksheet and what merchandise can be found in that worksheet.

Last Modified 60 is the date and time of the last modification to the worksheet.

Modified By 58 is the name of the last user to modify the worksheet.

Taken MD$ 46 is the total amount of markdowns taken in the worksheet.

Taken Markdowns 50 is the total number of markdowns taken in the worksheet.

Recommended Markdowns 51 is the total number of recommended markdowns in the worksheet.

Recommended MD$ (which can be added by user configuration) is the total amount of the recommended markdowns in the worksheet.

Planned MD$ (which can be added by user configuration) is the total markdown budget for the current period, in dollars.

Planned GM % (which can be added by user configuration) is the total planned gross margin percent for the current period.

Recommended GM % (which can be added by user configuration) is the total recommended gross margin percent for the current period.

Planned GM$ (which can be added by user configuration) is the total planned gross margin dollars for the current period.

Recommended GM$ (which can be added by user configuration) is the total recommended gross margin dollars for the current period.

Figure 6:
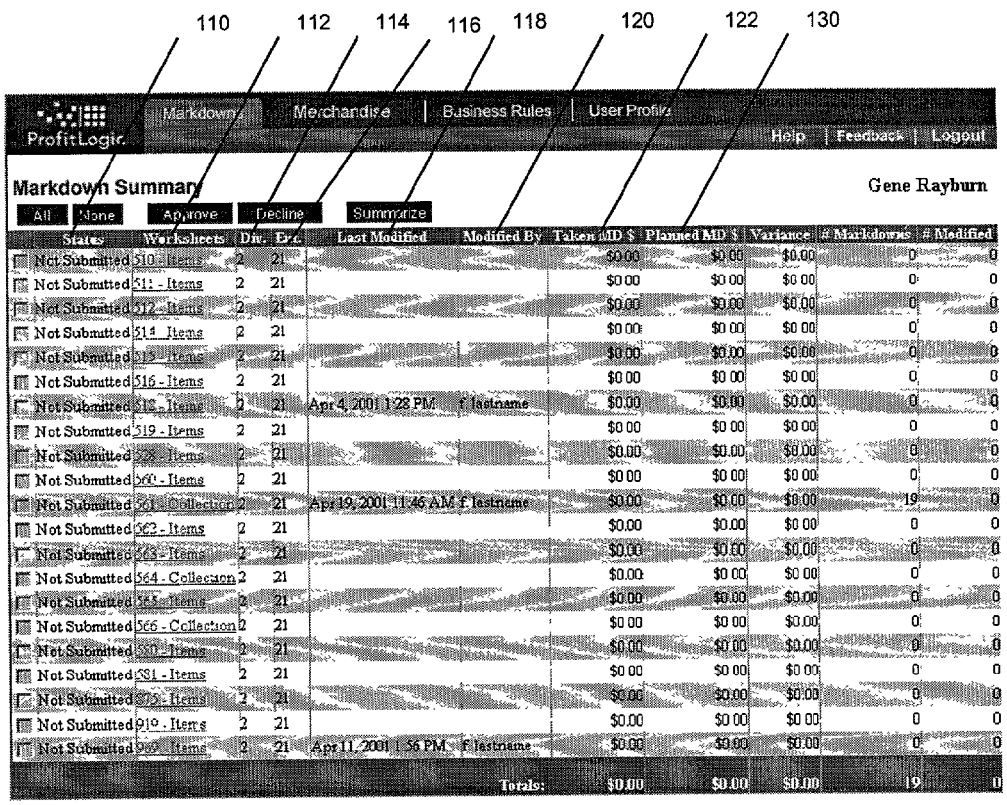
FIG. 6 shows a screen shot of a Markdown Summary Screen.

The Markdown Summary Screen shown in FIG. 6 provides users with the ability to look at summary metrics across multiple worksheets. The available metrics include, but are not limited to:

Status 110 indicates that a worksheet is Not Submitted, Submitted for approval, Approved, or Executed.

Worksheet ID 112, Division 114, Entity 116, and Subdivision (which can be added by user configuration) identify the worksheet and the merchandise that can be found in that worksheet.

Last Modified 118 is the date and time of the last modification to the worksheet.

Modified By 120 is the name of the last user to modify the worksheet.

Taken MD$ 122 is the total amount of markdowns taken in the worksheet.

Taken Markdowns (which can be added by user configuration) is the total number of markdowns taken in the worksheet.

Recommended Markdowns (which can be added by user configuration) is the total number of items recommended for markdowns this week.

Recommended MD$ (which can be added by user configuration) is the total amount of the recommended markdowns in the worksheet.

Planned MD$ 130 is the total markdown budget for the current period, in dollars.

Planned GM % (which can be added by user configuration) is the total planned gross margin percent for the current period.

Recommended GM % (which can be added by user configuration) is the total recommended gross margin percent for the current period.

Planned GM$ (which can be added by user configuration) is the total planned gross margin dollars for the current period.

Recommended GM$ (which can be added by user configuration) is the total recommended gross margin dollars for the current period.

From here, users can also select one or more worksheets to view a recommended forecast summary. A pop-up window (FIG. 12) displays the recommended forecast summary metrics by week. Values are the sum of the selected worksheets.

Figures 7, 8:
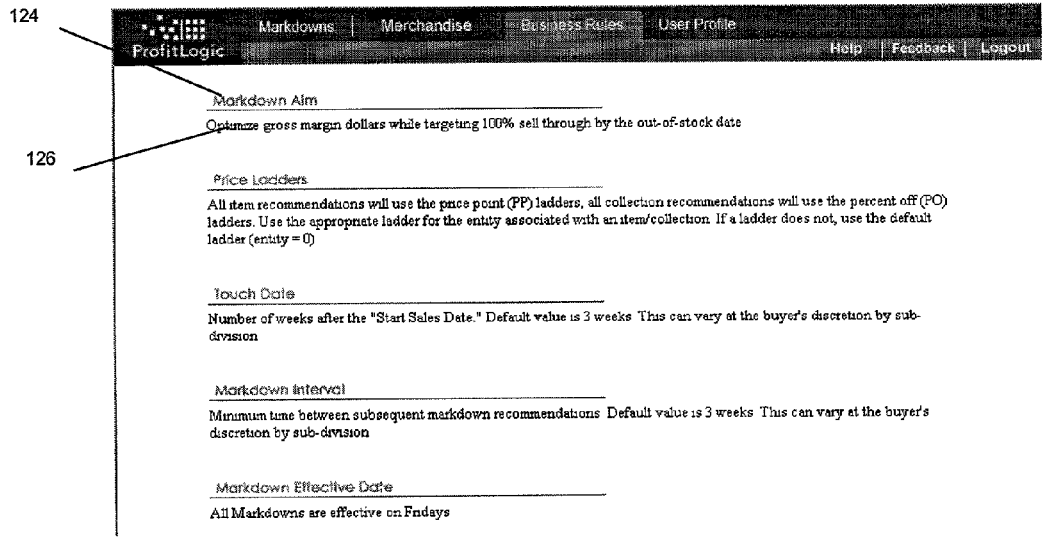
FIG. 7 shows a screen shot of a Business Rules Screen.
FIG. 8 shows a screen shot of a User Profile Screen.

Users can view their Business Rules or the guidelines that they have established around which the model's markdown recommendations are made by invoking the Business Rules tab to reach the page shown in FIG. 7. These rules determine when items are first eligible for markdowns, how deep the markdowns can be, how frequently markdowns can occur, what standard pricing is used, how inventory is handled, and any other constraints that affect markdown decisions. In FIG. 7, each rule or guideline is displayed using a heading 124 and a description 126 of the rule or guideline, displayed under the heading. The particular rule shown as item 126 is often a key objective of the model, namely to optimize gross margin dollars while targeting 100% sell through by the out-of-stock date.

Figure 9:
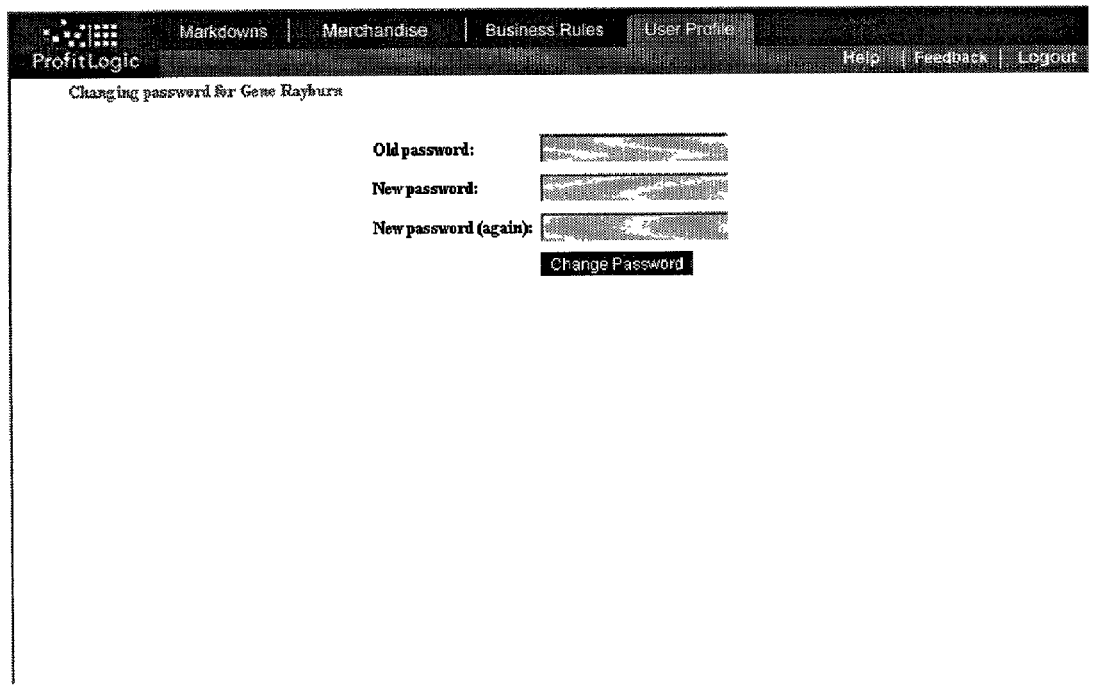
FIG. 9 shows a screen shot of a Change Password Screen.

The User Profile screen shown in FIG. 8 allows users to view a list 180 of the worksheets to which they have access and their permission level 182 for each of those worksheets. The screen shown in FIG. 9 enables the user to change his password.

Users can export merchandise data from the worksheet screen to an Excel or other delimited file.

Figures 11, 12:
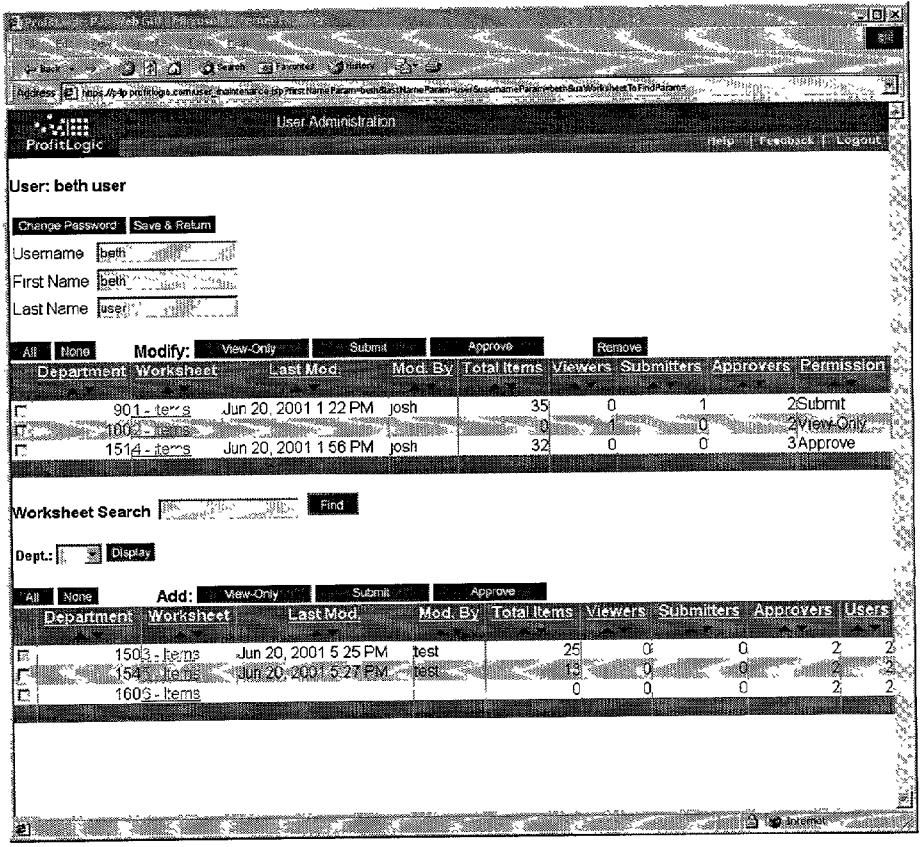
FIG. 11 shows a screen shot of a User Administration Screen.
FIG. 12 shows a screen shot of a Future Forecast Screen)

The User Management screen shown in FIG. 11 allows client system administrators to manage users.

System administrators can make worksheets available to any user at any of the permission levels shown below. A system administrator can suspend a user by removing all worksheet access from that user. A system administrator can also delete a user.

The permission levels are:

View-only access allows a user to look at all of the information in a worksheet, but does not allow the user to make any changes to it.

Submit access allows a user to edit a worksheet and to take markdowns. The user can save these changes, and can submit the worksheet for approval.

Approve access allows a user to edit a worksheet, submit it for approval, and approve or decline changes anyone has made to the worksheet.

Figure 10:
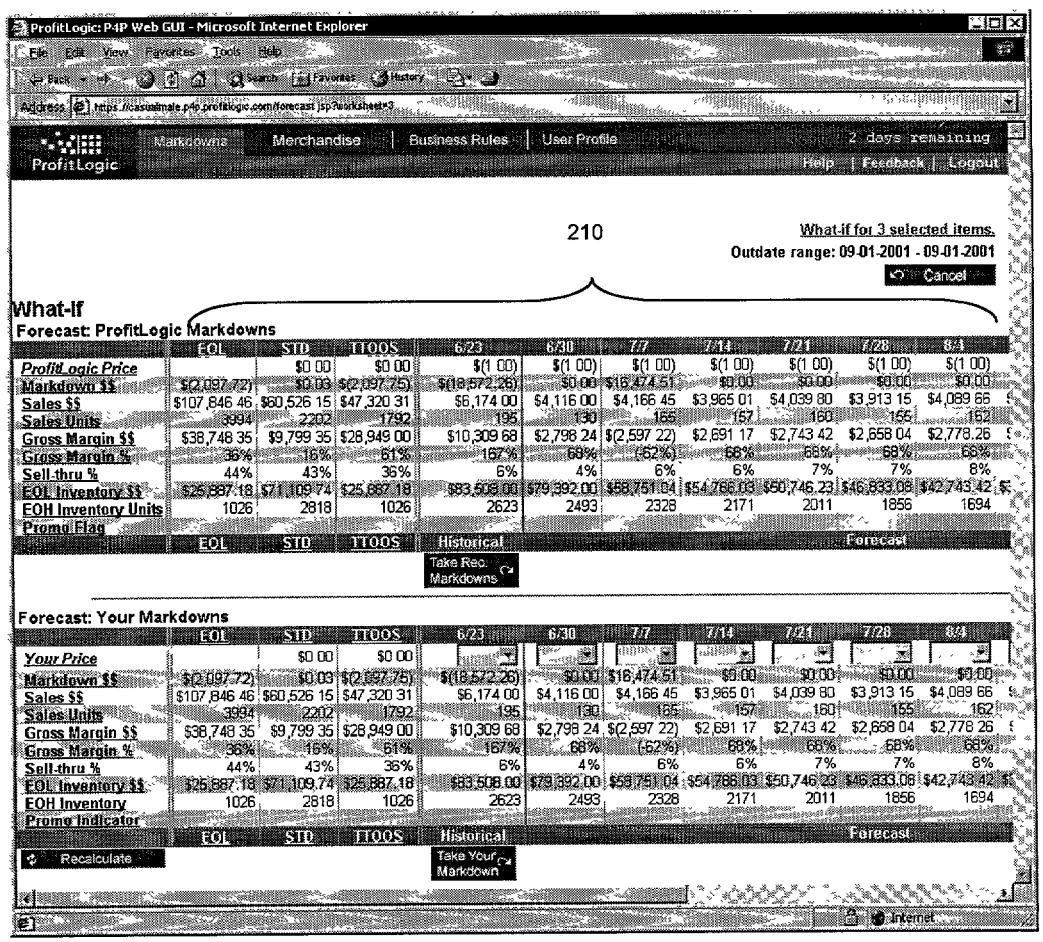
FIG. 10 shows a screen shot of a What if Screen.

Future Forecast information is provided at the top of the display shown in FIG. 10. The Future Forecast table enables the user to see, in respective columns 210 for weekly and monthly periods during a season, the expected MD's, Forecasted Sales and Inventory, and end of life gross margin. By-week data is displayed as a graph and/or a table. This forecast can be viewed for an arbitrary list of items/collections, or rolled up to include the entire worksheet, division, region, or chain, depending on what merchandise a user selects for the forecast. This allows buyers and higher level executives to anticipate MD budget needs and financial performance. This feature also allows users to take all of the recommended markdowns for the current time period.

A What-If section shown on the bottom of FIG. 10 allows the user to input various prices for a group of items/collections that the user selects, and to understand the effect of these changes on MD Cost, Forecasted Sales and Inventory, Future MD's, Inventory at Out of stock, and other metrics. By-week data will be displayed as a graph and/or a table. Users will be able to fully understand the impact of their decisions each week, and predict how these decisions will affect future performance. This feature also allows users to take the markdowns they input for the current time period.

The software may be run using Oracle, Weblogic, and Solaris or Linux or Windows NT or Windows 2000. Microsoft or other SQL servers could be used instead.

The aspects of the system that are client-customizable include:

column names (display and database), column ID, column description, summary metrics for each worksheet and across worksheets, the UI with client name and logo, the values for which are stored in an XML file.

Turning functionality on and off is also semi-configurable.

Other implementations are within the scope of the following claims.

The invention claimed is:

1. A machine-based method for price decision support comprising using a model to generate, automatically, an optimal price markdown scenario for a plurality of items of commerce, the optimal markdown scenario comprising recommendation for optimal markdown prices for each of the plurality of items of commerce, and being generated from historical information about demand behavior associated with prices of the plurality of items of commerce in accord with the relationship $$S(t)=N_o*N_c*t^{\lambda}*[e^{-(t/t_{pk})^{\alpha}}+C]$$

where S(t) represents gross sales revenues of the item(s) for which optimal markdown prices are being generated, t is time;

$N_0$ is a curve fitting parameter;

$N_o$ is a demand multiplier representing an increase in sales that occurs when price is reduced;

$t_{pk}$ is a time of peak sales;

α and γ are curve fitting constants; and

C is a residual sales rate at large values of t, displaying to a user, via a graphical user interface, a table showing the optimal price markdown scenario generated by the model, the table having rows, each of which identifies a respective item of commerce or group of items of commerce and which shows, for that respective item or group of items, a check-mark column for the user to indicate acceptance of a recommended markdown price, a status column that indicates a markdown status for the respective item or group of items, a column that shows an id for the respective item or group of items, a recommended marked-down price column, a marked-down price column that represents the price to which the respective item or group of items will be marked down, a current price column, and a cost of markdown column, having the user input, via the graphical display interface, proposed modifications to the markdown scenario shown in the table, displaying to the user, via the graphical user interface, an updated table showing an impact of the user-proposed modifications to the optimal price markdown scenario, the updated table having rows each of which identifies a respective item of commerce or group of items of commerce and which shows, for that respective item or group of items, a check-mark column for the user to indicate acceptance of a recommended markdown price, a status column that indicates a markdown status for the respective item or group of items, a column that shows an id for the respective item or group of items, a recommended marked-down price column, a marked-down price column that represents the price to which the respective item or group of items will be marked down, a current price column, and a cost of markdown column.

2. The method of claim 1 in which the updated table shows an impact of the user-proposed modifications on any of sales dollars, gross profit, or time when out of stock will occur.

3. The method of claim 1 in which the step of having the user input proposed modifications includes having the user specify a markdown price in place of a markdown price determined by the model.

4. The method of claim 1 in which the step of having the user input proposed modifications includes having the user reject one or more of the proposed markdowns.

5. The method of claim 1 in which the step of having the user input proposed modifications includes permitting the user to control execution of the step of displaying the updated table, thereby, permitting user interaction with the displayed information prior to committing to executing markdowns.

6. The method of claim 1 in which the displaying step includes displaying composite information about the total impact of a markdown scenario or user input proposed modifications thereto.

7. The method of claim 1 in which the rows of the table display information about items of commerce or groups of items of items of commerce at a level selected by the user.

8. The method of claim 7 in which the level comprises individual items, or items that belong to a style of one or more items of commerce, or subdivisions or division of a commercial operation.

9. The method of claim 1 in which the displaying step includes displaying a forecast of financial outcomes by time period with respect to one or more of the items of commerce.

10. The method of claim 9 in which the financial outcomes include sales, inventory, or margin.

11. The method of claim 1 in which the displaying step includes displaying a what-if analysis that predicts financial outcomes based on user indicated markdowns in a succession of time periods.

12. The method of claim 11 in which the financial outcomes includes sales, inventory, or margin.

* * * * *